June 22, 1943.　　　M. H. TUFT　　　2,322,328

ROD WEEDER

Filed Dec. 11, 1939

INVENTOR:
MILES H. TUFT

BY
ATTORNEYS.

Patented June 22, 1943

2,322,328

UNITED STATES PATENT OFFICE 2,322,328

ROD WEEDER

Miles H. Tuft, Moline, Ill., assignor to Deere & Company, Moline, Ill., a corporation of Illinois Application December 11, 1939, Serial No. 308,556

7 Claims. (Cl. 97—42)

The present invention relates to agricultural implements and is more particularly concerned with rod weeders, wherein a long revolving rod is drawn transversely through the soil below the surface thereof for uprooting weeds or breaking the same from their roots.

The object and general nature of this invention is to provide improved means for driving the revolving weeder rod from the traction wheel of the implement, and one of the features of the invention resides in mounting the reverse-directional gears on the wheel axle. Another feature of the present invention consists in driving the rod through a chain disposed to run in an inclined plane, said drive being effected without twisting the chain and thereby subjecting the chain to excessive stresses. Still another feature is the provision of a laterally inclined countershaft disposed between the traction wheel and the weeder rod drive shaft.

Figure 1:
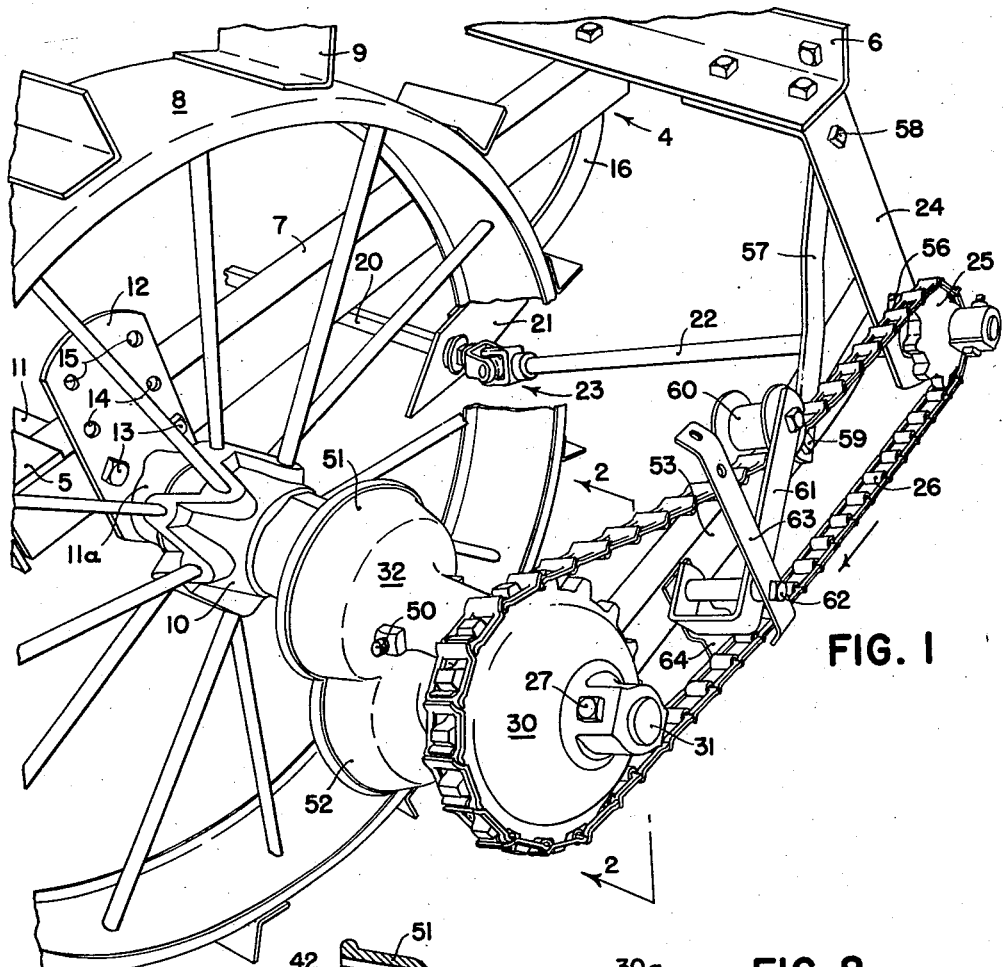
Figure 2:
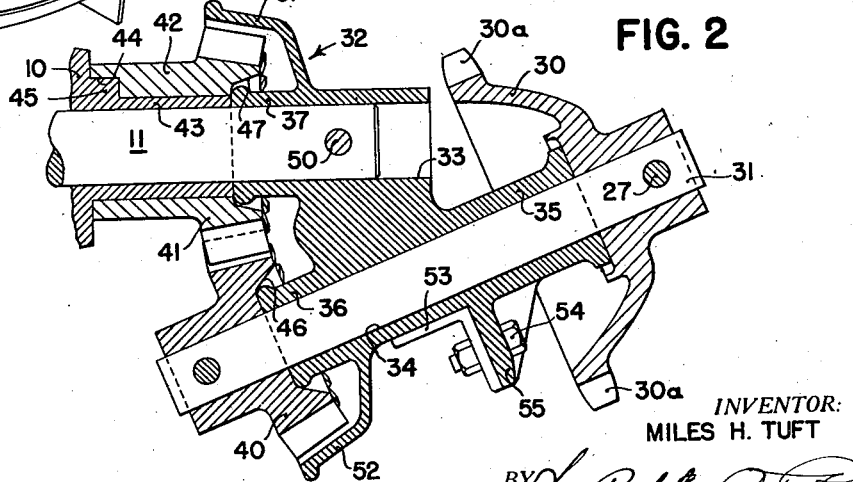

Other objects and advantageous features of the present invention will be recognized by those skilled in the art after consideration of the following detailed description of a preferred embodiment thereof, reference being had to the accompanying drawing, in which Figure 1 is a fragmentary perspective view of a rod weeder illustrating the principles of my invention; and Figure 2 is an enlarged transverse section through the gear housing, taken along the vertical plane through the axle, substantially as indicated by the line 2—2 in Figure 1.

Referring now to the drawing, the frame of the implement is indicated as a whole by the numeral 4, and comprises front and rear transversely extending angle bars 5 and 6, connected at their ends by longitudinally extending side bars 7 (only one of which is shown). The frame is suitably supported on laterally spaced ground wheels 8, of which only the wheel at the left end of the frame is seen in Figure 1. This left wheel 8 serves as a traction wheel for driving the rotary rod, the tread portion thereof having any suitable traction lugs or cleats 9 mounted thereon. The wheel 8 has a hub 10 which is journaled on a transversely disposed axle 11 that extends inwardly beyond the wheel hub and is journaled in bearings 11a supported in two transversely spaced mounting members or brackets 12 (only one of which is shown) fixed by bolts 13 to the side bars 7. The brackets 12 are provided with additional sets of spaced holes 14 and 15 so that the longitudinal frame bars 7 may be secured to the bracket plates 12 in any of three different elevated positions in effecting the depth adjustment of the rotary rod, as will be hereinafter described.

Rigidly secured to the frame 4 at spaced intervals are rod-supporting beams or pendants 16 which curve downwardly and forwardly in gooseneck formation. The lower ends of the beams 16 are adapted to carry the rotary rod 20 down into the ground, and to this end they are provided with shoe-like bearing housings 21 in which the rotary rod has bearing support. It will be observed that the forward end of the shoe-like member is pointed for better penetration of the ground.

The rotary rod extends across substantially the entire width of the machine and is arranged to be driven from the traction wheel 8 through power transmission mechanism which will now be described.

An inclined drive shaft 22 is operatively connected with one end of the rotary rod 20 by means preferably consisting of a universal joint 23, and the drive shaft extends laterally upward therefrom and is journaled in a suitable bearing supported in an outwardly bent depending bracket 24 fixed to the outer end of the transverse frame member 6. A sprocket wheel 25 is fixed to the laterally outer end of the inclined drive shaft 22, and this sprocket is chain-connected by means of a forwardly extending driving chain 26 to a driving sprocket wheel 30 fixed at 27 to a laterally inclined countershaft 31 journaled in a housing 32 carried on the outer end of the wheel axle 11. The countershaft 31 is preferably disposed in the vertical plane of the axle 11 and substantially parallel with the drive shaft 22, hence the sprocket wheel 30 is inclined to substantially the same angle as sprocket 25, and the upper and lower runs of the chain 26 are disposed in a laterally inclined plane.

The housing 32 is preferably in the form of a casting, and is formed with two intersecting passages or sockets 33, 34 constituting bearings adapted to receive the wheel axle 11, and inclined countershaft 31, respectively. Extension sleeves 35, 36 and 37 provide additional bearing support for the shafts 11 and 31, particularly at the points of greatest stress as will be pointed out hereinafter.

The driving sprocket 30 is bell-shaped, as clearly shown in Figure 2, and a plane through the centers of teeth 30a intersects the sleeve 35 at a point well back from the end thereof. Thus, the shaft 31 is supported in the plane of the chain 26 against the stresses incident to the transmission of power through said chain.

Fixed to the other end of the countershaft 31 is a bevel gear 40, which meshes with a companion bevel gear 41 coaxial with the wheel axle 11. Gear 41 is provided with an elongated hub 42 which fits snugly over a sleeve extension 43 of the wheel hub 10 and has a recess 44 formed in the laterally inner end thereof engageable with a projection 45 on the wheel hub. The engagement of the projection 45 in the hub recess 44 provides a driving connection between the wheel and bevel gear 41 and causes the latter to rotate coadunatively with the wheel. The bevel gears 40 and 41 are each recessed centrally, as at 46, 47, to receive the extension sleeves 36, 37, respectively, whereby the shafts 11 and 31 are provided bearing support in the planes of their respective gear teeth.

The gear housing 32 is secured on the end of the wheel axle 11 by means of a bolt 50 passed through aligned holes in the axle and housing. Skirts 51 and 52 are formed integrally with the gear housing and extend over the teeth of the gears 40, 41 to cover and protect the same against trash, stones, and like obstacles. The housing is held against turning about the axis of the wheel axle 11 by means of an angle bar 53 which is bolted at 54 to a flange 55 on the housing 32 and extends rearwardly therefrom. The rear end of the bar 53 is pivotally connected by a pivot bolt 56 to the bracket 24 adjacent the bearing support of the drive shaft 22, and is swingable vertically about said pivot bolt. A diagonal brace 57 is fixed at 58 to the bracket 24, and at 59 to the angle bar 53 for securing the angle bar and bracket together in a rigid, truss-like structure. Suitable means (not shown) is provided for increasing or decreasing the angle between bracket 24 and angle bar 53 to accommodate vertical adjustments of the wheel axle bracket 12 relative to the side bar 7, and such means may take the form of alternative adjustment holes in any of the three members 24, 53, or 57 to receive the bolts 58, 59, as the case may be.

A chain tightener spool 60 is journaled on an arm 61 which is pivotally connected with the angle bar 53 by means of a pivot bolt 62, said spool bearing downwardly on the top run of the chain 26 which is slack by reason of the clockwise rotation of the sprocket 30 as the implement is drawn forwardly, i. e., to the left in Figure 1. Also fixed to the angle bar 53 by the pivot bolt 62 are two vertically disposed chain guide members 63, 64 disposed on opposite sides of the chain and adapted to prevent the chain from whipping sidewise when the implement is traveling over rough ground.

The operation of my invention is as follows:

Forward movement of the implement over the ground causes the drive wheel 8 and bevel gear 41 to rotate in one direction, the companion bevel gear 40, countershaft 31, and drive sprocket 30 being driven in the opposite direction. Power is transmitted from the drive sprocket 30 to the driven sprocket 25 through the inclined drive chain 26, and serves to drive the inclined shaft 22 and weeder rod 20.

What I claim as my invention and desire to secure by Letters Patent is:

1. In a rod weeder, a generally transversely disposed frame having an axle projecting laterally from one end thereof and a traction wheel journaled on said axle, a rotary weeder rod spaced rearwardly of said axle, a laterally inclined drive shaft having one end connected with said rod and a sprocket fixed to the other end thereof, a housing mounted on the laterally outer end of said axle, a countershaft journaled on said housing for rotation about an axis inclined to said axle, a driving gear mounted on said axle and connected with said wheel to rotate therewith, a driven gear fixed to said countershaft in mesh with said driving gear, a driving sprocket fixed to said countershaft, and a chain trained over said sprockets in driving engagement therewith.

2. In a rod weeder, the combination of a generally transverse frame, a bracket member fixed to one end of said frame and adjustable vertically relative thereto, an axle mounted on said bracket and extending laterally outward therefrom, a ground wheel journaled on said axle, a transversely extending rotary rod carried by said frame and adapted to penetrate the ground, a drive shaft journaled on said frame and having operating connection with said rod, a gear housing fixed to the outer end of said axle, a countershaft journaled on said housing, intermeshing driving and driven gears fixed to said ground wheel and countershaft, respectively, a sprocket wheel fixed to said countershaft and a second sprocket wheel fixed to said drive shaft, a chain trained over said sprockets in driving engagement therewith, and a member fixed to said housing and pivotally connected with the frame adjacent said drive shaft for holding the housing and axle substantially in fixed relation to the drive shaft.

3. In a rod weeder, the combination of a generally transverse frame, a mounting member fixed to one end of said frame and adjustable vertically relative thereto, an axle journaled on said mounting member and extending laterally outward therefrom, a ground wheel journaled on said axle, a transversely extending rotary rod carried by said frame and adapted to penetrate the ground, a drive shaft journaled on said frame and having operating connection with said rod, a bracket member fixed to the outer end of said axle, a countershaft journaled on said bracket member, driving connection between said ground wheel and said countershaft, means affording driving connection between said counter shaft and said rod drive shaft, and a member fixed to said bracket member and connected with the frame adjacent said drive shaft for holding the bracket substantially in fixed relation to the drive shaft.

4. In a rod weeder the combination of a frame, a transversely extending rotary rod carried by said frame and adapted to penetrate the ground, a drive shaft journaled on said frame and having operating connection with said rod, a mounting member connected with said frame and adjustable vertically relative thereto, an axle supported on said mounting member and projecting laterally outward therefrom, a ground wheel journaled on said axle, a bracket mounted on said axle to the outside of said wheel, said bracket being rockable about the axis of said axle, a countershaft journaled on said bracket and having operating connection with said wheel, driving connection between said countershaft and said rod drive shaft, and a member connected with said bracket and with the frame adjacent said drive shaft for maintaining said countershaft at a fixed distance from said drive shaft, said bracket rocking about the axis of said wheel axle to accommodate vertical adjustment of said bracket with respect to said frame.

5. In a rod weeder, the combination of a frame, a bracket member fixed to said frame and adjustable vertically relative thereto, an axle mounted on said bracket, a ground wheel journaled on said axle, a transversely extending rotary rod carried by said frame and adapted to penetrate the ground, a drive shaft journaled on said frame and having operating connection with said rod, a housing mounted for rocking movement about the axis of said axle, a countershaft journaled on said housing, intermeshing driving and driven gears fixed to said ground wheel and countershaft, respectively, driving connection between said countershaft and said drive shaft, and a member fixed to said housing and connected with the frame adjacent said drive shaft for holding said countershaft at a substantially fixed distance from the drive shaft.

6. A rod weeder comprising a frame having a transversely disposed axle, a traction wheel mounted on the axle, a transversely disposed weeder rod carried by said frame and adapted to travel beneath the surface of the ground, a drive shaft operatively connected with one end of said rod and extending laterally upwardly therefrom, a countershaft disposed with its axis parallel to the axis of said inclined drive shaft, means supporting said countershaft on said axle, driving connection between said traction wheel and said countershaft, and a second driving connection between the countershaft and said drive shaft.

7. A rod weeder comprising a frame having a transversely disposed axle, a traction wheel mounted on the axle, a transversely disposed weeder rod carried by said frame and adapted to travel beneath the surface of the ground, a drive shaft operatively connected with one end of said rod and extending laterally upwardly therefrom, a countershaft disposed with its axis parallel to the axis of said inclined drive shaft, means supporting said countershaft on said axle, means connecting said traction wheel with said countershaft for driving the latter in the reverse direction, sprockets fixed to said countershaft and to said drive shaft, respectively, and a driving chain trained around said sprockets, the upper and lower runs of the chain being disposed in a plane perpendicular to the axes of said drive shaft and said countershaft.

MILES H. TUFT.